United States Patent
Blum et al.

(10) Patent No.: US 6,455,111 B1
(45) Date of Patent: Sep. 24, 2002

(54) IMPREGNATING, CASTING AND COATING COMPOUNDS FOR ELECTROTECHNICAL AND/OR ELECTRONIC COMPONENTS AND FOR CARRIER MATERIALS FOR PLANE INSULATING MATERIALS

(75) Inventors: Rainer Blum, Ludwigshafen (DE); Manfred Eichhorst, Oststeinbek (DE); Gunther Hegemann, Hamburg (DE); Klaus-Wilhelm Lienert, Hamburg (DE)

(73) Assignee: Schenectady International, Inc., Schenectady, NY (US)

( * ) Notice: Subject to any disclaimer, the term of this patent is extended or adjusted under 35 U.S.C. 154(b) by 0 days.

(21) Appl. No.: 09/381,174

(22) PCT Filed: Mar. 16, 1998

(86) PCT No.: PCT/EP98/01513

§ 371 (c)(1),
(2), (4) Date: Feb. 2, 2000

(87) PCT Pub. No.: WO98/41994

PCT Pub. Date: Sep. 24, 1998

(30) Foreign Application Priority Data

Mar. 19, 1997 (DE) .......................................... 197 11 410

(51) Int. Cl.⁷ ................................................. H01B 3/42
(52) U.S. Cl. ...................... 427/498; 522/179; 522/181; 522/107; 427/501; 427/512; 427/513; 427/58; 427/96; 427/116
(58) Field of Search ................................. 522/107, 179, 522/181; 427/498, 501, 504, 510, 512, 513, 58, 96, 116

(56) References Cited

U.S. PATENT DOCUMENTS

| 4,048,257 A | | 9/1977 | Stevenson |
| 4,623,696 A | * | 11/1986 | Mabrey et al. |
| 5,252,682 A | | 10/1993 | Bayha |

FOREIGN PATENT DOCUMENTS

| DE | 1 570 273 | 2/1970 |
| DE | 1 702 323 | 6/1971 |
| DE | 24 60 768 | 7/1976 |
| DE | 31 07 450 A1 | 10/1982 |
| DE | 32 29 639 A1 | 2/1984 |
| DE | 40 24 204 A1 | 2/1992 |
| DE | 196 00 149 A1 | 4/1997 |
| DE | 195 42 564 A1 | 5/1997 |
| DE | 196 00 136 A1 | 7/1997 |
| DE | 196 00 137 A1 | 7/1997 |
| DE | 197 07 492 A1 | 8/1998 |
| EP | 0 101 585 | 8/1983 |
| EP | 0 322 808 | 7/1989 |
| EP | 0 623 660 A2 | 11/1994 |
| WO | 92/14764 | 9/1992 |

OTHER PUBLICATIONS

Cyclopentadiene and Cyclopentene, Ullmann's Encyclopedia of Industrial Chemistry, Fifth, Completely Revised Edition, pp. 227–237, Nov. 1987.
JP–A–9 059 329, Derwent Abstract No. 97–209364, Mar. 1997.

* cited by examiner

Primary Examiner—Susan W. Berman
(74) Attorney, Agent, or Firm—Pillsbury Winthrop, LLP

(57) ABSTRACT

The subject of the present invention is the use of a resin composition (A) comprising A1) at least one unsaturated polyester resin, A2) at least one vinyl ether having a viscosity of less than 4000 mPa·s at 25° C., A3) if desired, at least one further polymer and/or oligomer, A4) if desired, at least one curing accelerator, A5) if desired, at least one ethylenically unsaturated reactive diluent, and A6) if desired, further customary additives, as impregnating, casting and coating compositions for electrical and/or electronic components and for carrier materials for sheetlike insulating materials.

The present invention additionally relates to coating compositions suitable for this purpose which can be cured with low emissions.

14 Claims, No Drawings

IMPREGNATING, CASTING AND COATING COMPOUNDS FOR ELECTROTECHNICAL AND/OR ELECTRONIC COMPONENTS AND FOR CARRIER MATERIALS FOR PLANE INSULATING MATERIALS

This application is the national phase of international application PCT/EP98/01513 filed Mar. 16, 1998 which designated the U.S.

The present invention relates to the use of unsaturated polyester resins as impregnating, casting and coating compositions for electrical and/or electronic components and for carrier materials for sheetlike insulating materials.

The present invention also relates to coating compositions suitable for this purpose which can be cured with low levels of emissions.

By impregnating, casting and coating compositions are meant, according to the present application, resin compositions that are employed in electrical engineering by the commonly known methods of dip impregnation, the trickle technique, the dip-rolling technique, the flooding technique and the process of casting for the impregnation of windings or the like, these methods possibly being assisted by the application of reduced and/or superatmospheric pressure. This term also embraces the impregnation of carrier materials for sheetlike insulating materials, such as glass fibres, mica tapes and other absorbent materials, and combinations thereof, and in this context one option is to terminate curing at the B-stage in order to obtain curable prepregs.

The windings of electrical machines are customarily impregnated by saturation. The function of this impregnation is to induce a mechanical strengthening of the winding, so that the winding is able to absorb mechanical and electromechanical forces, so that the winding is protected against harmful external influences, such as, for example, the deposition of dust particles, collector abrasion, humidity, salts and solvents, so that mechanical damage due to particles sucked in, for example, by the fan is prevented and so that the heat which develops when the electrical machines are operated can be dissipated by ohmic and dielectric losses from the winding to the surrounding cooling devices, which contributes to prolonging the service life of the electrical device.

The impregnation of these windings, or the coating/impregnation of other electrical and/or electronic components, is usually carried out by means of resins or lacquers which cure to form thermosets. Since firstly the requirements on the long-term thermal stability of these thermosets are very high and secondly the properties set out above, especially the electrical insulation capacity, must be provided, there are a range of lacquers and resins that are tailored to the specific fields of use.

In the case of the solvent-containing lacquers, whose solvent fraction must be removed prior to the curing operation, the penetrative extent of impregnation of the electrical windings is generally poor in the case of a single application. This hinders the dissipation, already referred to above, of ohmic and dielectric heat losses from the interior of the windings. In addition, the removal of the solvent often necessitates long preheating periods and complex temperature regimes for the curing of the lacquer. With the solvent-containing lacquers, moreover, expensive apparatus is required for cleaning the waste air, since otherwise there is considerable pollution of the environment as a result of solvent vapours.

For this reason the lacquers in the electrical industry, aside from special cases, have been replaced by solvent-free resins. Here, the unsaturated polyester resins in particular have come to occupy a broad area, since they have considerable advantages over other thermosetting resin systems. For example, the properties required can to a large extent be met by molecular tailoring of the unsaturated polyester resins: for example, the selection of specific monomer building blocks or the establishment of specific molecular weights. In addition, the reactivity of the unsaturated polyester resins can be influenced in such a way as to permit short and hence cost-effective production processes for windings of electrical machines.

The unsaturated polyester resins, and especially the unsaturated polyesterimide resins, have particularly outstanding properties with respect to the requirement of long-term heat resistance in particular.

In general, the unsaturated polyester resins are constructed on the one hand from base resins consisting, for example, of alpha,beta-unsaturated dicarboxylic acids, further, modifying mono-, di- and/or polycarboxylic acids, di- and/or polyols and, in the case of polyesterimides, from imide-functional hydroxyl- and carboxyl-containing building blocks, and on the other hand from comonomers which react with the alpha,beta-unsaturated dicarboxylic acid units of the base resin and are able to lead to thermosets. A preferred comonomer is styrene, which owing to its good dissolution properties is also used to establish the processing viscosity. Under appropriate conditions in the course of curing, the comonomers are fully copolymerized. A solvent-free system of this kind is dubbed an impregnating resin. As with the impregnating lacquers, the vapour pressures of the comonomers give rise at application temperature to evaporation losses, although generally lower than those in solvent-containing systems (50%, based on amount of solvent employed, evaporation loss with solvent-containing impregnating lacquers, from 10 to 30% evaporation loss with impregnating resins).

Nevertheless, even when using impregnating resins based on unsaturated polyesters there is still a need for the waste air to be cleaned, although such waste-air units can be given a lower design cleaning capacity than when impregnating lacquers are used, since by suitable resin formulations and process adaptations it is possible to reduce the monomer losses.

The use of other resin systems, such as epoxy resins, for example, has the disadvantages that long curing times are necessary, that the possibilities for adapting the processing properties to the production processes are small without seriously impairing the dielectric properties, and that some resin constituents, such as, in the case of epoxy resins, for example, the highly heat-resistant cycloaliphatic types and, in the case of the curing agents, the amines, may have a high toxicity.

German Patent Application P 195 425 64.2, then, which is not a prior publication, describes a process for impregnating electrically conducting substrates which uses free-radically curing resin systems which in addition to a resin that can be cured free-radically to form a thermoset, a hardener and, if desired, an accelerator may also include, if desired, comonomer-free vinyl ethers. Details of suitable vinyl ethers, however, are not given in this document. German Patent Applications P 196 00 136.6 and P 196 00 137.4, likewise not prior publications, disclose solvent-free coating compositions comprising polyesters having dihydrodicyclopentadienyl end groups. These coating compositions in accordance with German Patent Application P 196 00 136.6 are used for coating or for printing metal containers, and the coating compositions in accordance with German Patent Application P 196 00 137.4 are employed, in particular, as printing inks.

Furthermore, German Patent Applications P 196 00 149.8 and P 197 07 492.8, both not prior publications, disclose the use of polyester resins having dihydrodicyclopentadiene end groups as impregnating, casting and coating compositions for electrical and electronic components. The additional use of vinyl ethers in the resin compositions is not described in these applications.

DE-A-31 07 450 describes unsaturated polyester with oligomers of dicyclopentadiene as end groups, which are used as solutions in ethylenically unsaturated monomers to produce mouldings and coatings. The ethylenically unsaturated monomers employed as reactive diluents are, in general, problematic owing to their high vapour pressure at room temperature and at processing temperature, and to the emission problems which this entails.

EP-A-0 101 585 describes unsaturated polyester resins which are modified by the addition of cyclopentadiene onto the double bonds of the unsaturated units of the polyester and are then dissolved in vinyl monomers as reactive diluents. Again a problem is the use of vinyl monomers as reactive diluents, from an ecological and toxicological standpoint.

EP-A-623 660 discloses free-radically curable coating compositions comprising unsaturated polyester resins dissolved in vinyl ether compounds having an average molecular weight of from 72 to 1000. The use of polyesters with dihydrodicyclopentadiene units, however, is not described. In addition, the coating compositions of EP-A-623 660 are used as furniture varnish. The mandatory inclusion of waxes that is prescribed by EP-A-623 660, moreover, makes the coating compositions unusable for electrical insulation applications owing to disruptions to the homogeneity in the component.

Finally, U.S. Pat. No. 5,252,682 discloses resin compositions which comprise polyesters having dihydrodicyclopentadiene units, monomeric vinyl ethers, such as triethylene glycol divinyl ether and dimethanolcyclohexane divinyl ether, for example, and cationic initiator. Information on the end uses of these resin compositions, however, is not described in U.S. Pat. No. 5,252,682. In particular, there are no references to the use of these resin compositions in the field of the coating of electrical/electronic components. Furthermore, the resin compositions described therein are poorly suited to this field of use, since the elimination products of the metallic, cationic initiators, which remain in the cured compositions, unacceptably impair the dielectric properties of the cured compositions.

The present invention is therefore based on the object of providing impregnating, casting and coating compositions for electrical and/or electronic components and for carrier materials for sheetlike insulating materials, which compositions do not have the abovementioned disadvantages of the prior art. In particular, therefore, these compositions should be able to be cured with low emissions and should as far as possible be able to be labelled as monomer-free. Nevertheless, these compositions should have a very high reactivity, rendering them curable within short times at curing temperatures that are not too high, so that decomposition phenomena in the resins, and instances of damage to the materials, are avoided. Moreover, these compositions must not give off elimination products to any notable extent under the processing and curing conditions.

This object is surprisingly achieved by employing a resin composition (A) which comprises
- A1) at least one unsaturated polyester resin,
- A2) at least one vinyl ether having a viscosity at 25° C. of less than 4000 mPa·s,
- A3) if desired, at least one further polymer and/or oligomer,
- A4) if desired, at least one curing accelerator,
- A5) if desired, at least one ethylenically unsaturated reactive diluent, and
- A6) if desired, further customary additives.

The present invention also provides coating compositions that are suitable for this utility and can be cured with low emissions.

In the text below, then, the individual components of the resin composition will be elucidated further:

Polyester Component (A1)

As component (A1) the resin compositions used in accordance with the invention comprise one or more unsaturated polyesters containing optionally imide-functional building blocks. Of these constituents, unsaturated polyester resins are fundamentally known. Imide-functional unsaturated polyester resins are described, for example, in DE-A-15 70 273, DE-A-17 20 323 and DE-A-24 60 768.

The unsaturated polyesters are prepared in a known manner from di- and/or polyfunctional carboxylic acids and di- and/or polyfunctional alcohols, alone or together with monocarboxylic acids and/or monoalcohols.

In addition to maleic and/or fumaric acid, which are employed with preference, examples of suitable polycarboxylic acids are phthalic acid, isophthalic acid, terephthalic acid, tetrahydro- and/or hexahydrophthalic acid, endomethylenetetrahydrophthalic acid, malonic acid, succinic acid, adipic acid, suberic acid, glutaric acid, sebacic acid, azelaic acid, trimellitic acid, pyromellitic acid, di- and/or polycarboxylic acids having ethylenically unsaturated structural units, such as itaconic acid and citraconic acid, for example, mono- or polyunsaturated fatty acids, such as the fatty acids of coconut oil, groundnut oil, castor oil, wood oil, soya bean oil, linseed oil, cottonseed oil or safflower oil, and/or the anhydrides of the said polycarboxylic acids insofar as they can be synthesized.

It is also possible of course, instead of the free acids, to employ the corresponding esters with lower alcohols or with allyl alcohol or with other alcohols [lacuna] partially esterified di- and/or polycarboxylic acids, such as monoallyl trimellitate and diallyl pyromellitate, for example.

Examples of diols suitable for preparing the polyesters are ethylene glycol, propanediols, butanediols, hexanediols, allyl alcohol, neopentyl glycol hydroxy-pivalate, neopentyl glycol, diethylene glycol, cyclohexanediol, cyclohexanedimethanol, trimethyl-pentanediol and ethylbutylpropanediol. Also suitable, furthermore, are aliphatic polyetherdiols, such as linear or branched poly(oxyethylene) glycols, poly(oxypropylene) glycols and/or poly(oxybutylene) glycols, and mixed polyetherdiols, such as poly(oxyethyleneoxypropylene) glycols. The polyetherdiols usually have a molar mass $M_n$ of from 400 to 3000.

Other diols which can be employed, furthermore, are aromatic or alkylaromatic diols, such as, for example, 2-alkyl-2-phenyl-propane-1,3-diol, bisphenol derivatives with ether functionality, hydrogenated bisphenols, and so on.

Other suitable diols include esters of hydroxycarboxylic acids with diols, where the diol employed can be the abovementioned diols. Examples of hydroxycarboxylic acids are hydroxypivalic acid or dimethylol-propanoic acid.

Examples of suitable polyols are ditrimethylolpropane, trimethylolethane, trimethylolpropane, glycerol, pentaerythritol, homopentaerythritol, dipentaerythritol, trishydroxyethylisocyanate, 1,2,4 butanetriol [sic], propane- and hexane-triols, trihydroxycarboxylic acids, such as trishydroxymethyl (ethyl)ethanoic acids, trimethylolethane monoallyl ether, trimethylolpropane monoallyl ether, trimethylolethane diallyl ether, trimethylolpropane diallyl ether, pentaerythritol monoallyl ether, pentaerythritol diallyl ether. The polyols having at least 3 OH groups can be employed alone or as a mixture. If desired, the triols can be employed together with monofunctional alcohols, such as, for example, butanol, octanol, lauryl alcohol, cyclohexanol, tert-butylcyclohexanol, ethoxylated and/or propoxylated phenols. As di- and/or polyol building blocks it is also possible to employ oligomeric and/or polymeric di- and/or polyols, such as, for example: hydroxyl-modified polybutadienes, hydroxyl-containing polyurethanes or hydroxyl-containing epoxy resins.

Also suitable for preparing the polyesters are compounds which have a group that is reactive towards the functional groups of the polyester. As modifying component it is possible to use diepoxide compounds, alone or with monoepoxide compounds. Suitable components are, for example, those described in DE-A-40 24 204 on page 4, lines 4 to 9. Also suitable are unsaturated glycidyl compounds, such as glycidyl undecenoate, (meth)acrylicization products of epoxy resins, allyl glycidyl ether, vinyl glycidyl ether and, preferably, glycidyl (meth)acrylate. These glycidyl compounds can be included at the synthesis stage or—preferably—are added subsequently.

Compounds suitable for preparing the polyesters include those possessing, in addition to a group that is reactive towards the functional groups of the polyester, a tertiary amino group as well, for example monoisocyanates having at least one tertiary amino group or mercapto compounds of at least one tertiary amino group. For details reference is made to DE-A-40 24 204, page 4, lines 10 to 49.

Through the (additional) use of di- and/or poly-functional amines, such as ethylene diamine, 1,2- and 1,3-propylenediamine, hexamethylenediamine, phenylenediamine or melamine, for example, it is also possible to obtain polyesters having amide groups.

The molecular weight of the polyesters of the invention can be regulated using monofunctional compounds, such as alcohols, for example butanol, hexanol or else (oligo) dihydrodicyclopentadienol, monofunctional amines, for example propylamine or aniline, and monofunctional carboxylic acids, such as acetic acid or benzoic acid, for example.

The polyesters (A) are prepared by the known methods of esterification, as is described, for example, in DE-A-40 24 204, page 4, lines 50 to 65.

This reaction usually takes place at temperatures between 180 and 280 degrees C, possibly in the presence of an appropriate esterification catalyst such as, for example, lithium octoate, dibutyltin oxide, dibutyltin dilaurate, para-toluenesulphonic acid, hydrophosphorous [sic] acid and the like. Non-metallic catalysts are preferably employed.

Usually, the preparation of the polyesters is carried out in the presence of small amounts of an appropriate solvent as entrainer. Examples of entrainers employed are aromatic hydrocarbons, such as in particular xylene, and (cyclo) aliphatic hydrocarbons, for example cyclohexane. In addition, however, it is also possible to prepare the polyesters without solvent (reaction in bulk).

The synthesis of polyesters of the invention that satisfy specific requirements in relation, for example, to hardness, elasticity or processing viscosity takes place in accordance with rules that are known to the skilled worker. For example, the elasticity of the polyesters can be varied via the chain length of the incorporated polyols and/or polycarboxylic acids between the ester linkage points: polyesters with hexanediol and/or adipic acid building blocks, for example, are more elastic than polyesters with ethylene glycol and/or phthalic acid building blocks.

Furthermore, the skilled worker is aware that by incorporating tri- or higher polyfunctional polyols and/or polycarboxylic acids, and the associated introduction of branching points in the polyester molecule, it is possible to influence critically the properties, especially the viscosity, of the polyester resins.

Particular preference is given to the use as component (A1) of unsaturated polyesters which comprise, as structural units, dihydrodicyclopentadienyl units of the formula (I) and/or oligodihydrodicyclopentadienyl units of the formula (II):

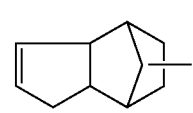

(I)

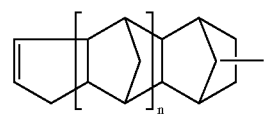

(II)

where n=1 to 10.

The dihydrodicyclopentadienyl units and/or the oligodihydrodicyclopentadienyl units are preferably esters of dihydrodicyclopentadienol, as in formula (III), or esters of oligodihydrodicyclopentadienol, as in formula (IV):

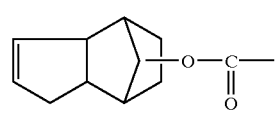

(III)

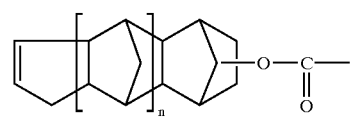

(IV)

where n=1 to 10.

Particularly preferred dihydrodicyclopentadiene units and/or oligodihydrodicyclopentadiene units are monoesters of dihydrodicyclopentadienol with maleic acid and/or fumaric acid, as in formula (V), or monoesters of oligodihydrocyclopentadienol with maleic acid and/or fumaric acid, as in formula (VI):

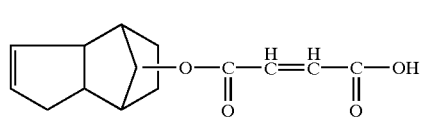

(V)

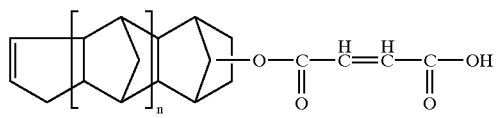

(VI)

where n=1 to 10.

The dihydrodicyclopentadienyl and the oligodihydrodicyclopentadienyl structural units of the formulae (I) to (VI) are all derived from the starting material dicyclopentadiene, which in turn is a dimerization product of cyclopentadiene (regarding the synthesis of cyclopentadiene compare, for example, Ullmanns Enzyklopadie der technischen Chemie, 4th ed., volume 9, pages 699 to 704, Verlag Chemie, Weinheim, 1975).

Cyclopentadiene dimerizes spontaneously at room temperature to form dicyclopentadiene. At temperatures above 100° C., preferably at temperatures between 170 and 300° C. and under pressure, cyclopentadiene reacts with itself, via dicyclopentadiene as intermediate, to form oligodicyclopentadiene, by the mechanism of the Diels-Alder reaction. When catalysts are added, such as, for example, the halides of aluminium, antimony, boron, iron, bismuth or tin, cyclopentadiene polymerizes in the absence of oxygen to form polycyclopentadiene with molecular weights of up to more than 10,000 daltons.

The dihydrodicyclopentadiene and/or oligodihydrodicyclopentadiene units present in the coating compositions of the invention are based on the corresponding dihydrodicyclopentadienol of formula (VII):

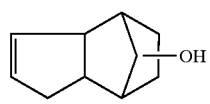

(VII)

or on the corresponding oligodihydrocyclopentadienol of the formula (VIII):

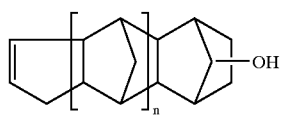

(VIII)

where n=1 to 10.

The compounds of the formulae (VII) and (VIII) are available commercially and are obtainable, for example, from dicyclopentadiene and oligodicyclopentadiene, respectively, by adduct formation with water, with or without acid catalysis.

In the preparation of the binders of the invention the (oligo)dihydrodicyclopentadienols of the formulae (VII) and (VIII) can also be employed per se as a synthetic building block.

The structural units of the formulae (III) and (IV) are preferably obtainable by reacting dicyclopentadiene or oligodicyclopentadiene with acids, preferably with carboxylic acids and, with particular preference, with polycarboxylic acids. Very particular preference is given to the use as acid of maleic and/or fumaric acid in amounts such that the corresponding monoesters of the formulae (V) and (VI) are obtained as structural units. To prepare the synthetic building blocks according to the formulae (III) to (VI), the dicyclopentadiene or the oligodicyclopentadiene is preferably reacted with the (poly)carboxylic acid in the presence of water at preferably elevated temperature.

The structural building blocks (III) to (VI), which contain ester groups, can of course also be obtained by reacting the corresponding dihydrodicyclopentadienol (VII) or the corresponding oligodihydrodicyclopentadienol (VIII) with acids, preferably with carboxylic acid, with particular preference with polycarboxylic acids and, with very particular preference, with maleic and/or fumaric acid.

In a further embodiment of the invention the binders employed in accordance with the invention are prepared as follows:

In a first stage a polyester resin, polyesteramide resin or polyesterimide resin (prepolyester) is synthesized which features no structural units of the formula (I) and of the formula (II) but instead as an excess of free acid groups, resulting from a specific proportion of hydroxyl groups to acid groups during the polyester synthesis. In the following stage, the prepolyester is reacted with dicyclopentadiene, optionally in the presence of catalysts, in a polymer-analogous manner to give the polyesters having the structural units of the formulae (I) and/or (II). In the case of unsaturated prepolyesters having ethylenically unsaturated double bonds, the addition of cyclopentadiene onto the double bonds occurs as a side reaction, leading in the case of maleic acid units, for example, to the formation of endomethylenetetrahydrophthalic acid structural units.

It may also be desirable to introduce the oligodihydrodicyclopentadiene structures of formula (II) in higher proportions in order, for example, to raise the hardness of the end products.

Component (A1) is employed in the resin compositions that are employed in accordance with the invention preferably in an amount of from 5 to 95% by weight, with particular preference from 30 to 80% by weight and, with very particular preference, from 40 to 70% by weight, based in each case on the overall weight of resin composition.

Vinyl Ether Component (A2)

It is essential to the invention that the resin compositions employed in accordance with the invention comprise as component (A2) one or more vinyl ethers having a viscosity at 25° C. of less than 4000 mPa·s, preferably less than 2000 mPa·s and, with particular preference, less than 100 mPa·s. The vinyl ethers that are employed as component (A2) preferably, moreover, have a number-average molecular weight of more than 72 to less than 4000, preferably of more than 250 to less than 2000 and, with particular preference, of from 300 to less than 1000. The addition of these vinyl ethers normally on the one hand reduces the viscosity of the resin compositions and on the other hand increases the reactivity.

Examples that may be mentioned of vinyl ethers which can be used in accordance with the invention are: ethyl vinyl ether, (iso-)propyl vinyl ether, (iso-)butyl vinyl ether, octadecyl vinyl ether, ethylene glycol mono- and divinyl ether, diethylene glycol mono- and divinyl ether, butanediol divinyl ether, hexanediol mono- and divinyl ether, triethylene glycol vinyl ether, cyclohexanedimethanol vinyl ether, ethylhexyl vinyl ether, cyclohexyl vinyl ether, (iso)amyl vinyl ether, trimethylolmono-, trimethyloldi-, and trimethyloltrivinyl ether, aminopropyl vinyl ether and diethylaminoethyl vinyl ether.

It is preferred as component (A2) to employ vinyl ethers which have a very low vapour pressure at 25° C., preferably a vapour pressure at 25° C. of less than 5 mbar, with particular preference of less than 1 mbar and, with very particular preference, of less than 0.2 mbar.

Very particular preference is given, therefore, to the use of oligomeric and/or polymeric vinyl ethers. These substances generally have the desired low vapour pressure and are not hazardous working materials and comply with the statutory provisions for polymers (cf. e.g. EU Official Journal of 5.6.92, No. L 154/3).

Examples that may be mentioned of suitable oligomeric and/or polymeric vinyl ethers are the following compounds: polyethylene glycol mono- and polyethylene glycol divinyl ether, polypropylene glycol mono- and polypropylene glycol divinyl ether, monoalkyl polyethylene glycol monovinyl ethers, monoalkyl polypropylene glycol monovinyl ethers, polytetrahydrofuran mono- and polytetrahydrofuran divinyl ether, monoalkyl polytetrahydrofuran monovinyl ethers, vinyl ethers of oxalkylated branched polyols, such as oxalkylated trimethylolpropane or oxalkylated pentaerythritol.

The vinyl ethers are employed in the resin compositions in an amount such that the particular desired processing viscosity and the desired light sensitivity is achieved. They are therefore commonly employed in an amount of from 1 to 70% by weight, preferably from 5 to 50% by weight, and, with particular preference, from 10 to 40% by weight, the percentages by weight being based on the overall weight of the resin composition.

Further Polymer (A3)

The resin compositions employed in accordance with the invention preferably comprise in addition one or more further polymers and/or oligomers. Particularly suitable such polymers and/or oligomers are those that are reactive under the prevailing curing conditions. Also suitable, however, are compounds of this kind that are not reactive. Furthermore, the so-called organic fillers and/or organic white pigments are also suitable as component (A3).

It is particularly preferred to employ, as component (A3), compounds which are different from component (A1) but which likewise have the dihydrodicyclopentadiene structural units of the formula (I) and/or the oligodihydrocyclopentadiene structural units of the formula (II).

Such substances employed preferably as component (A3) are derived from monofunctional alcohols or polyfunctional hydroxy compounds having more than two hydroxyl groups per molecule, some or all of which have been esterified with monocarboxylic acids of the formulae (V) and/or (VI), but which may also in part have been esterified with other substances or etherified.

Furthermore, the substances suitable for component (A3) can be derived from monofunctional or polyfunctional amine compounds which have been reacted either in whole or else in part with monocarboxylic acids of the formulae (V) and/or (VI) to form amides or salts.

Furthermore, the substances suitable for component (A3) can be derived from monofunctional or polyfunctional epoxide compounds which have been reacted either in whole or else in part with monocarboxylic acids of the formulae (V) and/or (VI).

Examples that may be mentioned are substances suitable as component (A3) are the esters of compounds of the formula (V) and/or (VI) with mono- and polyalcohols, such as butanol, hexanol, butanediol, hexanediol, polyethylene glycol monoalkyl ethers, polypropylene glycol monoalkyl ethers, trimethylolpropane, pentaerythritol or more highly functionalized hydroxyl compounds or hydroxyl-functional diene oils. Other suitable polyols for esterification with substances of the formulae (V) and/or (VI) are hydroxyl-functional saturated polyesters. The substances suitable as component (A3) may also be obtained from carboxy-functional saturated polyesters or other hydroxyl-reactive mono- or polyfunctional compounds, which are reacted with (oligo)dihydrodicyclopentadienyl alcohol of the formulae (VII) and /or (VIII). Also of particular importance are the esters of the ethoxylation and propoxylation products of hydroxyl compounds, and also polyester- and polyetherpolyols of the polyethylene oxide, polypropylene oxide, polytetrahydrofuran and polycaprolactone type.

By way of the nature of the alkoxylating agents and the degree of alkoxylation it is also possible to control properties of the end products such as, for example, hardness, hydrophilicity and elasticity. It is also possible for such polyols to have been only partly esterified with compounds of the formulae (V) and (VI), the remaining hydroxyl groups either remaining free or being able to be etherified or esterified with other substances or to be reacted with other, hydroxyl-reactive substances. Examples of suitable such substances are isocyanates or epoxides. Hydroxyl-containing natural oils, such as castor oil, for example, are also of importance.

Further substances suitable as component (A3) include adducts of compounds of the formula (V) and/or (VI) with epoxides.

Further substances of the type mentioned are reaction products of carboxylic acids of the formulae (V) and/or (VI) with mono- or polyfunctional amines. These reaction products can be saltlike adducts, but are preferably amides. Examples are the reaction products of amino-functional polyethylene oxides, polypropylene oxides or diene oils with compounds of the formula (V) and/or (VI).

The compounds that are employed as component (A3) are preferably prepared separately and then mixed with the polyesters (A1) employed in accordance with the invention, optionally with curing accelerators (A4), optionally with reactive diluents (A5) and optionally with auxiliaries (A6) to form ready-to-use electrical insulating compositions. In many cases, however, it is also possible to prepare such substances in situ in the course of the polyester preparation by appropriate adjustment of the stoichiometric proportions.

In the resin compositions employed in accordance with the invention, component (A3) is preferably employed in an amount from 1 to 80% by weight, with particular preference from 3 to 30% by weight and, with very particular preference, from 5 to 20% by weight, based in each case on the overall weight of the resin composition.

Curing Accelerator (A4)

As component (A4), the resin compositions employed in accordance with the invention include from 0 to 10% by weight, preferably from 2 to 5% by weight, based on the overall weight of the resin composition, of curing accelerators for catalyzing the free-radical polymerization. These curing accelerators are generally compounds which by photolytic and/or thermal means form free radicals for initiating the free-radical polymerization.

Examples suitable for photolytic initiation of the free-radical polymerization are benzoin, benzoin ethers, substituted benzoins, alkyl ethers of substituted benzoins, such as alpha-methylbenzoin alkyl ethers or alpha-hydroxymethylbenzoin alkyl ethers, for example; benzils, benzil ketals, such as benzil dimethyl ketal or benzil methyl benzyl ketal, for example; ketone-based initiators, such as, for example, acetophenone and its derivatives, such as diethoxyacetophenone or m-chloroacetophenone, benzophenone and its derivatives, such as 4,4'-dimethylaminobenzophenone or 4,4'-diethylaminobenzophenone, propiophenone, hydroxy-cyclohexyl phenyl ketone, 2-hydroxy-2-methyl-1-phenylpropan-1-one; antraquinone [sic] and its derivatives, and also thioxantone [sic] and its derivatives, and also mixtures of different curing accelerators.

In this context, the curing accelerators can also be bonded chemically to the components of the resin composition, and especially to component (A1). The curing accelerators with H acceptor groups are preferably used in a form in which they are bonded polymerically to the polyesters; for example, by the concomitant use of pure-condensable phenone, xanthone and/or thioxanthone compounds, such as, for example, hydroxy- or bishydroxybenzophenone or benzophenone carboxylic acids and/or benzophenonecarboxylic esters, in the course of the polycondensation of the polyester resins.

Examples suitable for the thermal initiation of the free-radical polymerization are conventional peroxides, hydroperoxides, azo compounds, azides or thermally labile C—C compounds, such as highly substituted ethanes, for example.

A considerable acceleration in the curing, or reduction in the curing temperature, is possible using metal co-initiators, such as cobalt manganese, iron, nickel or lead compounds.

Alternatively, the coatings can be cured thermally and/or by means of UV or electronic radiation, preferably UV radiation, without the use of photo-initiators.

For the curing of the coating compositions of the invention it is possible, furthermore, to employ mixtures of thermal and photolytic initiators.

The preferred use of stabilizers in combination with the curing accelerators is favourable for good stability of the resin compositions in the course of processing. Particularly suitable in this context are the stabilizers of the type of the hydroquinones, of the quinones, of the alkylphenols and/or alkylphenol ethers. Examples hereof are hydroquinone, methylhydroquinone, p-benzoquinone, secondary and tertiary methylphenols, tertiary butylphenols, tertiary amylphenols, octylphenols, butylated xylenols and butylated cresols.

It is particularly favourable in this context to employ the stabilizers as mixtures. In this case at least 2 of the stated stabilizers should be employed in order to ensure firstly that the impregnating resins are thermally stable up to a temperature of 50° C. over a prolonged period and secondly that reaction of the impregnating resin compositions is no longer prevented at a curing temperature of 100° C. The stabilizers are used in customary amounts. The overall amount of the stabilizers employed can amount, for example, to from 0.005 to 0.5% by weight, preferably from 0.01 to 0.1 and, with particular preference, from 0.01 to 0.05% by weight, based on the overall composition. The quantitative ratios between the stabilizers can vary within broad ranges; in the case of the use of 2 stabilizers, for example, they may lie at a ratio of from 1:1 to 20:1, preferably from 1:1 to 10:1 and vice versa. Similar ranges are possible when more than 2 stabilizers are employed. Mixtures of stabilizers of the quinone type with those of the alkylphenol type are particularly suitable.

Reactive Diluents (A5)

In addition it is technically possible to employ in minor amounts—preferably in an amount from 0 to 20% by weight, and with particular preference from 2 to 10% by weight, based on the overall weight of the resin composition—the known ethylenically unsaturated reactive diluents, examples being styrene, vinyltoluene, allyl ethers, allyl esters, α-methylstyrene, vinylcarbazole, vinylcaprolactam, vinylpyrrolidone, mono- and oligomeric, mono- and/or polyfunctional acrylates and vinyl esters.

Hence it is possible, for example, to formulate low-styrene compositions while obtaining the other good properties of the compositions of the invention, in order, for example, to keep below statutory limits on the concentrations or emissions of styrene.

Additives (A6)

If desired, the resin compositions may also comprise customary additives (A6) in customary amounts, preferably in an amount of from 0 to 20% by weight and, with particular preference, from 0.5 to 10% by weight.

Examples that may be mentioned of suitable compounds are: surface-active substances, such as ionic and nonionic surfactants, for example, and also fluorinated surfactants, antifoams, plasticizers, such as phthalates, adipates and phosphates, and the like.

If desired, the resin compositions may also include soluble and insoluble colorants in customary amounts. furthermore, the resin compositions can if desired also comprise fillers and/or pigments in customary amounts.

Using the Resin Compositions

The impregnating, casting and coating compositions of the invention are applied by the processes, widely known in electrical engineering, of dip impregnation, the trickle technique, the dip-rolling technique, the flooding technique and the process of casting for the impregnation of windings or the like. Details of these techniques are as follows:

the impregnation of the substrate that is to be impregnated, and which may have been preheated, takes place in general by dipping it into the liquid resin composition (A), leaving the substrate that is to be impregnated in the resin composition for a time, until the resin composition has reached all areas to be impregnated and, possibly, until the resin that has penetrated the substrate gels, emersing the impregnated substrate and allowing it to drip dry, and then curing the resin composition (A) that has been taken up.

The trickling of the resin composition (A) onto the substrate that is to be impregnated takes place by trickling the resin composition (A) onto the substrate, which may have been preheated, by means of appropriate pumps, (A3) if desired and (A6) if desired being metered in by means of suitable mix-metering devices prior to the trickle application of the resin composition (A1) or the resin composition (A) being activated already beforehand by addition of the hardener (A3).

Flooding with the resin composition (A) takes place by causing a rising bath of the resin composition (A) to flood the optionally preheated substrate in such a way that sufficient impregnation of the substrate takes place, then leaving the resin composition (A), possibly until the resin that has penetrated the substrate has gelled, allowing the substrate to drip dry, and then curing the resin composition (A) that has been taken up by the substrate.

Dip-rolling with the resin composition (A) takes place by the optionally preheated substrate being rolled through the activated resin composition (A) in such a way that, in the case of windings of electrical machines as substrate, only the winding and the winding-bearing part of the susbtrate are covered by the resin composition (A), until the winding has been sufficiently impregnated, and then curing the resin composition that has been taken up by the substrate (by the winding), preferably with rotation.

The casting of the substrates in a reusable or consumed mould with a preactivated resin composition (A) or, using an appropriate mix-metering system, by admixing (A4) if desired and (A6) if desired, directly prior to casting.

To improve the quality of impregnation, the impregnating technique set out above can preferably be conducted under vacuum or else in alternation between vacuum and overpressure.

The preheating of the substrate can be carried out, for example, by means of Joule heat (heating by electrical resistance), induction heating, microwave or infrared heating and by passing them through a conventional thermal oven.

The resin composition which adheres to the substrate following impregnation can be cured thermally: for example, in the case where the substrates are preheated, by means of Joule heat, induction heating, microwave or infrared heating and by passage through a conventional thermal oven, or by means of high-energy radiation, examples being UV radiation or electron beams. Preference, however, is given to a combination of thermal curing and radiative curing, it being possible to carry out both cures simultaneously or in any desired order of supply of energy. The inner regions of the components are cured preferably either by further supply of current and/or by post-curing in the oven, and curing on the substrate surface is preferably assisted by additional irradiation; for example, IR, UV or electron beams.

The examples which follow are intended to illustrate the invention further. All percentages relate, unless stated otherwise, to per cent by weight.

EXAMPLES

Example 1

Preparing an Unsaturated Polyester Resin (A1-1)

312 g of neopentyl glycol (3.0 mol) and 125 g of propylene glycol (1.2 mol) are heated to [sic] 140° C. under nitrogen in a customary laboratory stirred apparatus, 332 g of isophthalic acid (2.0 mol) are added in portions, and then the mixture is heated at 180° C. with distillative removal of the water of condensation in 2 hours. It is then cooled to 120° C., 232 g of maleic anhydride (2.0 mol) are added, and the mixture is heated in 2 hours to 200° C., with a vacuum being applied in the last 30 minutes. The resulting melt is cast onto aluminium foil and soldifies to give a resin having an acid number of 17 mg of KOH/g.

Example 2

Preparing a Component (A3-1)

1586.52 g of dicyclopentadiene (12.0 mol) and 1176.72 g of maleic anhydride (12.0 mol) are weighed out into a stirred flask with heater and reflux condenser. The mixture is heated to 125° C. under a gentle stream of nitrogen, and then 226.00 g of water (12.0 mol +10 g) are added by way of a dropping funnel in 1 hour. The mixture is allowed to react at 125° C. for one hour. A reaction mixture is obtained comprising predominantly a monocarboxylic acid of the formula (V). The contents of the flask are cooled to 70° C., and then 715.00 g of 1,6-hexanediol (6.05 mol), 4.00 g of dibutyltin dilaurate (DBTL) and 0.50 g of hydroquinone are added.

The mixture is rapidly heated to 120° C. under a gentle stream of nitrogen. Then, over 6 hours, the temperature is gradually raised to 190° C., during which the water of condensation that forms is removed by distillation. A viscous resin is obtained which has an acid number of 24 mg of KOH/g and a viscosity of 3650 mPas at 50° C.

Example 3

Preparing a Component (A3-2)

661.10 g of dicyclopentadiene (5.0 mol) and 490.30 g of maleic anhydride (5.0 mol) are weighed out into a stirred flask with heater and reflux condenser. The mixture is heated to 125° C. under a gentle stream of nitrogen, and then 95.00 g of water (5.0 mol +5 g) are added by way of a dropping funnel in one hour. The mixture is allowed to react at 125° C. for one hour. The result is a reaction mixture comprising predominantly a monocarboxylic acid of the formula (V). The contents of the flask are cooled to 70° C., and then 1859.00 g of TP 200 (5.5 mol-equivalent —OH), 3.00 g of dibutyltin dilaurate (DBTL) and 0.30 g of hydroquinone are added. TP 200 is an ethoxylation product of 1 mol trimethylolpropane and 20 mol of ethylene oxide. Esterification is carried out as in Example 2 to give a viscous, liquid resin having an acid number of 21 mg of KOH/g and a viscosity of 9340 mPa·s at 25° C. and of 1560 mPa·s at 75° C.

Example 4

Preparing an Unsaturated Polyester Resin (A1-2)

661.10 g of dicyclopentadiene (5.0 mol) and 490.30 g of maleic anhydride (5.0 mol) are weighed out into a stirred flask with heater and reflux condenser. The mixture is heated to 125° C. under a gentle stream of nitrogen, and then 95.00 g of water (5.0 mol +5 g) are added by way of a dropping funnel in 1 hour. The mixture is allowed to react at 125° C. for one hour. A monocarboxylic acid of formula (V) is formed. The contents of the flask are cooled to 70° C., and then 245.15 g of maleic anhydride (2.5 mol), 116.00 g of fumaric acid (1.0 mol), 272.70 g of neopentyl glycol (2.5 mol), 413.20 g of 1,6-hexanediol (3.5 mol), 4.00 g of dibutyltin dilaurate (DBTL) and 0.50 g of hydroquinone are added.

The mixture is rapidly heated to 120° C. under a gentle stream of nitrogen. Then, over 3 hours, the temperature is gradually raised to 190° C., and the water of condensation that forms is removed by distillation. After a further 3 h, the condensation is terminated. The result is a liquid resin having an acid number of 31 mg of KOH/g and a viscosity of 32,350 mPas at 25° C.

Example 5

Preparing an Unsaturated Polyester Resin (A1-3)

661.10 g of dicyclopentadiene (5.0 mol) and 490.30 g of maleic anhydride (5.0 mol) are weighed out into a stirred flask with heater and reflux condenser. The mixture is heated to 125° C. under a gentle stream of nitrogen, and then 95.00 g of water (5.0 mol+5 g) are added by way of a dropping funnel in one hour. The mixture is allowed to react at 125° C. for 1 hour. The result is a reaction mixture comprising predominantly a monocarboxylic acid of formula (V). The contents of the flask are cooled to 70° C., and then 245.15 g of maleic anhydride (2.5 mol), 116.00 g of fumaric acid (1.0 mol), 272.70 g of neopentyl glycol (2.5 mol), 436.60 g of 1,6-hexanediol (3.7 mol), 4.00 g of dibutyltin dilaurate (DBTL) and 0.50 g of hydroquinone are added.

The mixture is rapidly heated to 120° C. under a gentle stream of nitrogen. Then, over 3 hours, the temperature is gradually raised to 190° C., and the water of condensation that forms is removed by distillation. After a further 3 h, the condensation is terminated and the batch is left to cool to 70° C. The result is a liquid resin having an acid number of 18 mg of KOH/g and a viscosity of 16,880 mPas at 25° C. To the hot resin there are added 64.40 g of benzophenonetetracarboxylic dianhydride (0.20 mol), 70.00 g of gycidyl [sic] methacrylate (0.50 mol) and 10.00 g of triphenylphosphine as catalyst. The temperature is raised to 105° C. and maintained for 2.5 h. Then the mixture is cooled. The result is a liquid resin having an acid number of 11 mg of KOH/g and a viscosity of 53,650 mPas at 25° C.

Example 6

Preparing an Unsaturated Polyester Resin (A1-4)

245.15 g of maleic anhydride (2.5 mol), 290.00 g of fumaric acid (2.5 mol), 272.70 g of neopentyl glycol (2.5 mol), 107.00 g of trimethylolpropane monoallyl ether (0.5 mol), 87.00 g of trimethylolpropane diallyl ether (0.5 mol), 206.50 g of 1,6-hexanediol (1.75 mol), 4.00 g of dibutyltin dilaurate (DBTL) and 0.50 g of hydroquinone are weighed out into a stirred flask with heater and reflux condenser. The mixture is heated rapidly to 120° C. under a gentle stream of nitrogen. Then, over 3 hours, the temperature is gradually raised to 190° C., during which the water of condensation that forms is removed by distillation. After a further 3 h the condensation is terminated. The result is a liquid resin having an acid number of 32 mg of KOH/g and a viscosity of 36,750 mPas at 25° C.

Example 7

Curing Experiments

The substances of Examples 1 to 6 are used to prepare liquid compositions (M1 to M6) which can be cured both thermally and with UV light. For this purpose the resin compositions are weighed out into closeable bottles, heated to about 50° C. in a drying oven and mixed with a glass rod. After cooling, the curing accelerators are added, the bottles are sealed and the mixtures are homogenized overnight on a roller bed. This results in slightly viscous, clear, homogeneous resin formulations.

Table 1: Composition and viscosity of the resin compositions M1 to M6

TABLE 1

Composition and viscosity of the resin compositions M1 to M6

|      | M1   | M2   | M3   | M4   | M5   | M6   |
|------|------|------|------|------|------|------|
| A1-1 | 100  | 100  | —    | —    | —    | —    |
| A1-2 | —    | —    | —    | —    | 100  | 100  |
| A1-3 | —    | —    | 100  | —    | —    | —    |
| A1-4 | —    | —    | 10   | 100  | —    | —    |
| A3-1 | 20   | —    | —    | —    | —    | —    |
| A3-2 | —    | 15   | 15   | 20   | 20   | —    |
| P-490 | 35  | 35   | 35   | 35   | 35   | 35   |
| TBPB | 2    | 2    | 2    | 2    | 2    | 2    |
| BDK  | 3    | 3    | —    | 3    | 3    | 3    |
| Visc. | 4140 | 2950 | 2680 | 3360 | 2840 | 3070 |

Key to Table 1:

A1-1 to A1-4 and A3-1 and A3-2 are the above-described resins of Examples 1 to 6

P-490 is an experimental product of the company BASF AG, Ludwigshafen, a polytetrahydrofuran divinyl ether (vinylation product of polytetrahydrofuran) having a viscosity of 21 mPa·s at 25° C. and an average molecular weight of about 490, and corresponds to the legal definition of "polymer" (cf. EU Official Journal of 5.6.92, No. L 154/3)

TBPB is tert-butyl perbenzoate (peroxide catalyst)

BDK is benzil dimethyl ketal (photoinitiator)

Visc. is the viscosity of the resin compositions M1 to M6 at 25° C. in mPa·s 65 g of each of the resin compositions M1 to M6 are introduced into metal lids of 60 mm in diameter, are heated to 80° C. on a thermostated hot plate and are exposed with a mercury vapour lamp for 3 min at this temperature. The lamp has a radiation maximum at about 360 nm and at the height of the sample surface supplies an energy of 21 mW/cm$^2$. After exposure, a tack-free skin beneath which there is still liquid resin has formed on all samples. The metal lids are then aftercured at 130° C. in a drying oven for 2 hours. This results in light-brownish, hard, crack-free, clear resin blocks. The resins blocks are back-weighed in order to determine the curing emissions. For all samples these emissions are below 0.5%.

A second series of samples was exposed at 90° C. for 25 min. Thereafter, all of the samples had undergone complete through-curing, and for all samples the curing emissions were below 0.25%.

What is claimed is:

1. A process comprising:
   (i) impregnating, coating, or casting an electrical component or electronic component with a resin composition;
   (ii) curing said composition;
   wherein said composition comprises
      (a) at least one unsaturated polyester; and
      (b) at least one oligomeric or polymeric vinyl ether having a viscosity of less than 4000 mPas at 25° C.

2. A process comprising:
   (i) impregnating a carrier material for a sheetlike insulating material with a resin composition; and
   (ii) partially curing said composition to form a prepreg;
   wherein said composition comprises
      (a) at least one unsaturated polyester; and
      (b) at least one oligomeric or polymeric vinyl ether having a viscosity of less than 4000 mPas at 25° C.

3. The process of claim 2, wherein said carrier material comprises glass fibers or mica tapes.

4. The process of claim 1 or claim 2, wherein said at least one unsaturated polyester comprises, as structural units:
   (i) dihydrodicyclopentadiene units represented by the following formula (I); and/or
   (ii) oligodihydrodicyclopentadiene units represented by the following formula (II);

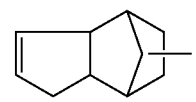

(I)

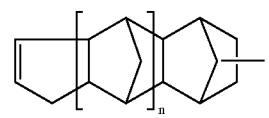

(II)

wherein n=1 to 10.

5. The process of claim 1 or claim 2, wherein said resin composition comprises at least two unsaturated polyesters having a structural unit represented by the following formula (I) or (II):

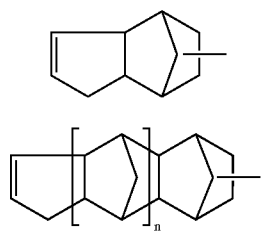

wherein n=1 to 10.

6. The process of claim 1 or claim 2, wherein said at least one vinyl ether has:
   a viscosity of less than 2000 mPas at 25° C.;
   a vapor pressure at 25° C. of less than 5 mbar; and
   a number average molecular weight of from more than 72 to less than 4000.

7. The process of claim 1 or claim 2, wherein said at least one vinyl ether has:
   a viscosity of less than 100 mPas at 25° C.;
   a vapor pressure at 25° C. of less than 1 mbar; and
   a number average molecular weight of from more than 250 to less than 2000.

8. The process of claim 1 or claim 2, wherein said at least one unsaturated polyester comprises, as structural units:
   (i) dihydrodicyclopentadiene units represented by the following formula (III); and/or
   (ii) oligodihydrocyclopentadiene units represented by the following formula (IV);

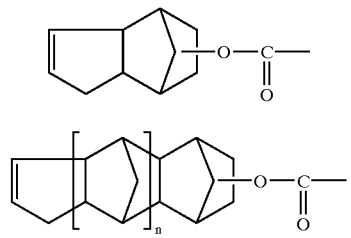

wherein n=1 to 10.

9. The process of claim 1 or claim 2, wherein said resin composition comprises at least two unsaturated polyesters having a structural unit represented by the following formulae (III) or (IV):

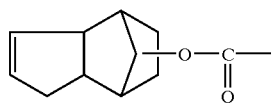

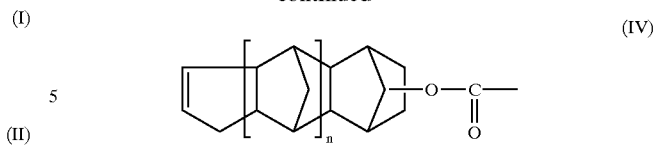

wherein n=1 to 10.

10. The process of claim 1 or claim 2, wherein said resin composition comprises at least two unsaturated polyesters formed from a compound represented by the following formula (V) or (VI):

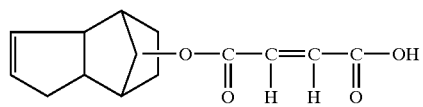

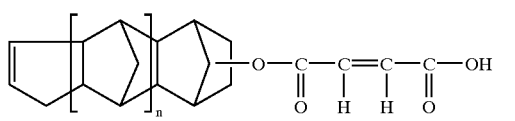

wherein n=1 to 10.

11. The process of claim 1 or claim 2, wherein said resin composition comprises:
   (a) 5–95 wt %, relative to the weight of the total composition, of said at least one unsaturated polyester; and
   (b) 10–40 wt %, relative to the weight of the total composition, of said at least one vinyl ether having a viscosity of less than 4000 mPas at 25° C.

12. The process of claim 1 or claim 2, wherein said at least one unsaturated polyester comprises a photoinitiating group, said group having a xanthone, thioxanthone and/or phenone moiety.

13. The process of claim 1 or claim 2, wherein said curing is effected with ultraviolet radiation, peroxides, and/or heat.

14. The process of claim 1 or 2, wherein said vinyl ether is selected from the group consisting of polyethylene glycol monovinyl ethers, polyethylene glycol divinyl ethers, polypropylene glycol monovinyl ethers, polypropylene glycol divinyl ethers, monoalkyl polyethylene glycol monovinyl ethers, monoalkyl polypropylene glycol monovinyl ethers, polytetrahydrofuran monovinyl ethers, polytetrahydrofuran divinyl ethers, monoalkyl polytetrahydrofuran glycol monovinyl ethers, and vinyl ethers of oxalkylated branched polyols.

* * * * *